United States Patent [19]

Robinson

[11] 3,899,995

[45] Aug. 19, 1975

[54] FINGERPRINTING ARRANGEMENT

[76] Inventor: Edward H. Robinson, 16704 Elgar Ave., Torrance, Calif. 95004

[22] Filed: Oct. 29, 1973

[21] Appl. No.: 410,798

[52] U.S. Cl. .......... 118/31.5; 118/418

[51] Int. Cl. .......... A61b 5/10

[58] Field of Search .......... 118/19, DIG. 24, 418; 117/109, .5, 1, 1.5; 355/3 DD, 15; 354/317, 323, 354

[56] References Cited

UNITED STATES PATENTS

| | | | |
|---|---|---|---|
| 2,792,641 | 5/1957 | Heathcote | 118/418 UX |
| 2,827,013 | 3/1958 | Gundlach | 118/DIG. 24 |
| 3,316,875 | 5/1967 | Murray et al. | 118/DIG. 24 |

*Primary Examiner*—Morris Kaplan

*Attorney, Agent, or Firm*—Don B. Finkelstein

[57] ABSTRACT

Fingerprint developing arrangement for providing a detectable fingerprint image on a preselected surface, which surface has a fingerprint thereon. A drum means having a powder receiving cavity therein is movably mounted on a frame means and, for example, may be rotatably mounted. An aperture is provided in the peripheral walls of the drum means and a closure means is coupled to the peripheral walls of the drum means adjacent the aperture and is movable from a closed position wherein the preselected surface having the fingerprint thereon is clamped over the aperture to an open position allowing access to the cavity in the drum means. A latch means is coupled to the drum means for detachably clamping the closure means in the closed position to prevent the fingerprint powder which may be contained within the cavity from leaving the cavity when the pre-selected surface is clamped over the aperture. Agitation means such as a motion producing means which may be a handle, are provided to rotate the drum and thus expose the fingerprint on the pre-selected surface to the fingerprint powder to provide the visually detectable image of the fingerprint thereon. Means vibrate the drum to inhibit powder caking.

6 Claims, 4 Drawing Figures

FINGERPRINTING ARRANGEMENT

BACKGROUND OF THE INVENTION

1. Field of the Invention

The present invention relates generally to the fingerprinting art and more particularly to an improved arrangement for providing a visually detectable fingerprint image on a preselected surface having a fingerprint thereon, such as a check, credit slip, or the like.

2. Description of the Prior Art

Various types of fingerprinting arrangements have been utilized as means of identifying a particular person. Their utilization in criminal identification is, of course, well known. However, there has recently been an increased desire to utilize fingerprints as a means of positive identification of people cashing checks, utilizing credit cards, or the like. Various systems have heretofore been proposed in which a fingerprint powder is placed into contact with a preselected surface upon which there is a fingerprint. For example, the preselected surface may be a check and the customer cashing the check presses a finger thereon to provide the fingerprint. The fingerprint powder is then contacted with the fingerprint to provide the visually detectable fingerprint image. Both non-magnetizable and magnetizable fingerprint powders have heretofore been proposed for such utilization. U.S. Pat. Nos. 3,132,036 and 3,549,397 both disclose arrangements for providing a visually detectable fingerprint image utilizing magnetizable powder. However, both such arrangements have not proven to be completely satisfactory in commercial utilization because the powder utilized was not sufficiently contained within the apparatus and thus often came into contact with the person whose fingerprint was to be recorded as well as the clothes of such a person and also any person utilizing the apparatus.

Thus, while there has been an increased demand for a simple economical, easy to operate and clean in operation arrangement for providing the visually detectable fingerprint image on such things as checks, credit slips or the like, the prior structures heretofore proposed for such commercial utilization have not been completely satisfactory.

SUMMARY OF THE INVENTION

Accordingly, it is an object of the present invention to provide an improved fingerprint developing arrangement.

It is another object of the present invention to provide a fingerprint developing arrangement in which the fingerprint powder is safely enclosed within structure and does not escape therefrom during normal utilization of the arrangement.

It is yet another object of the present invention to provide an improved fingerprint developing arrangement satisfactory for utilization in commercial establishments by comparatively inexperienced operating personnel.

It is yet another object of the present invention to provide an improved fingerprint developing arrangement that is economical to manufacture, has an exceptionally long operational life and is virtually foolproof in operation.

The above, and other objectives of the present invention, are provided in a fingerprint developing arrangement having a frame means upon which a drum means is movably mounted. For example, the drum means may be rotatably mounted on the frame means. The drum means has peripheral walls defining a powder containing cavity and the peripheral walls have a first portion defining an aperture therethrough. Communication to the powder containing cavity is achieved through the aperture. A preselected amount of fingerprint powder is placed within the powder containing cavity of the drum means.

A closure means is coupled to the peripheral walls of the drum means adjacent to the aperture, and, for example, may be hingedly coupled thereto. The closure means is movable from an open position in which access to the powder containing cavity is allowed, to a closed position wherein the closure means removably clamps the pre-selected surface, which, for example, may be a check, credit slip, or the like, having the fingerprint thereon, over the aperture and in powder sealing relationship to the first portions of the peripheral wall of the drum means. A latch means, if desired, may be coupled to the drum means for detachably clamping the closure means in the closed position to prevent fingerprint powder from leaving the powder containing cavity for the condition of the closure means in the closed position. The latch means, for example, may be a spring clip, a spring loaded hinge for coupling the closure means for the drum means, or the like. Rotation producing means is provided and is rotatably mounted on the frame means and coupled to the drum means for imparting rotational movement to the drum means.

In operation, when it is desired to provide a visually detectable fingerprint image, the person whose fingerprint is to be developed applies a fingerprint to the pre-selected surface such as, for example, a check or a credit slip. The pre-selected surface is then placed over the aperture in the drum means with the fingerprint directly over the aperture. The closure means is placed into the closed position and the latch means suitably retains it therein. The rotation producing means which, for example, may be a handle is actuated to impart rotational movement to the drum. During the rotation movement of the drum, the fingerprint powder contained within the cavity is forced, by gravity forces, into contact with that portion of the pre-selected surface having the fingerprint thereon. The rotational movement of the drum may be a full 360° rotation thereof, or any portion of a full rotation that insures contact of the powder with the fingerprint. When the drum has been rotated so that the closure means is again in a suitable position, the latch means may be suitably operated to allow opening of the closure means and removal of the pre-selected surface, without spilling the powder from the drum.

The fingerprint powder may be magnetizable or non-magnetizable. In either case, the fingerprint powder operates in the same manner by adhering to the oils left on the pre-selected surface corresponding to the fingerprint.

Thus, a complete fingerprint image of the desired fingerprint is provided. The fingerprint powder cannot leave the fingerprint cavity and is completely contained therein during all operations. Neither the operator nor the person whose fingerprint is being taken is subjected to contact with the powder.

If desired, an interlock means, which may take the form of a segmented guard ring is mounted on the frame means adjacent to the drum means and engages the closure means during a pre-selected portion of the rotation of the drum means and is free of contact with the closure means during other portions of the rotation of the drum means. For example, the pre-selected portion of the rotation, in an embodiment where the drum is rotated 360° may comprise an arc of 270° and the other portions may comprise approximately 90 degrees aligned symmetrically about a vertical plane through the axis of the drum means. Thus, during loading and unloading of the pre-selected surface into the aperture, the guard ring is free of contact therewith and allows complete freedom of insertion and removal. However, while the drum is being rotated, the guard ring prevents any inadvertent opening of the closure means and thus inadvertent spilling of the powder therefrom.

It has also been found that due to the very fine mesh of the powder, it often tends to cling or adhere to regions adjacent to the aperture. In order to prevent any of the powder from inadvertently escaping from the cavity during insertion and removal of the pre-selected surface, it has been found desirable to provide vibration producing means that vibrates the drum means to shake loose any caked powder that may be clinging to regions adjacent the aperture before the closure means is opened. Such vibration means may, if desired, take the form of a plurality of protuberances on the frame means and a striker arm coupled to the drum means engages the protuberances as the closure means approaches the vertically up position thus jarring loose any caked powder adhering to the regions adjacent the aperture.

BRIEF DESCRIPTION OF THE DRAWINGS

The above and other embodiments of the present invention may be more fully understood from the following detailed description taken together with the accompanying drawings wherein similar reference characters refer to similar elements throughout and in which.

DESCRIPTION OF THE PREFERRED EMBODIMENTS

Figure 1:
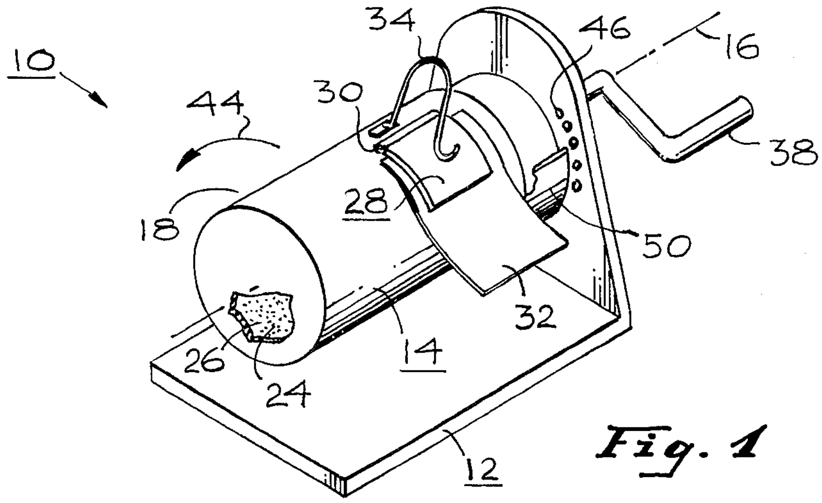
FIG. 1 is a prespective view of one embodiment of the present invention.

Referring now to the drawing there is illustrated one preferred embodiment, generally designated 10, of the present invention. The embodiment 10 generally comprises a frame means 12 upon which a drum means 14 is movably mounted. For example, the drum means 14 is movably mounted on the frame means 12 for rotation about an axis 16. The drum means 14 has peripheral walls 18 and a first portion 20 of the peripheral walls 18 define an aperture 22 providing communication with a powder containing cavity 24 defined by the peripheral walls 18.

A predetermined amount of fingerprint powder 26 is contained within the powder containing cavity 24 of the drum means 14. The fingerprint powder 26 may be either magnetizable or non-magnetizable as desired when utilized for non-magnetic surfaces having fingerprint to be developed thereon. However, if the surface is magnetic, then the fingerprint powder 26 must be non-magnetic powder. Fingerprint powders of the type useful in the practice of the present invention are well known in the art.

A closure means 28 is coupled to the peripheral walls 18 of the drum means 14 adjacent the aperture 22. For example, the closure means 28 may be hingedly coupled by means of hinge means 30 to the peripheral walls 18. The closure means 30 is movable from a closed position, such as that shown in FIG. 1, wherein a pre-selected surface 32 having a fingerprint thereon is clamped in powder sealing relationship to the first portion 20 of the peripheral walls 18 and having the fingerprint thereon positioned over and communicating with the aperture 22 to an open position, such as that shown in FIG. 2, to allow insertion and removal of the pre-selected surface 32.

Figure 2:
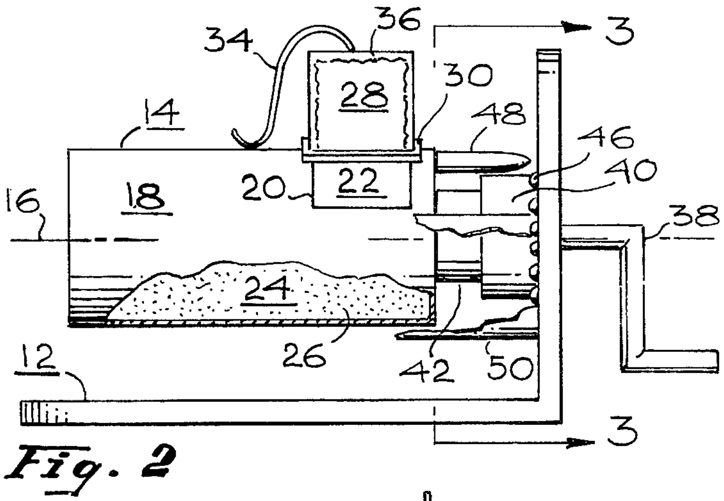
FIG. 2 is a side elevational view thereof.
Figure 3:
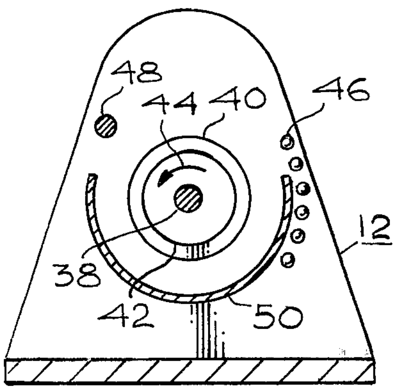
FIG. 3 is a sectional view along the line 3—3 of FIG. 2.

A latch means 34 is coupled to the peripheral walls 18 of the drum means 14 in regions adjacent the closure means 28 and is movable from a first position detachably clamping the closure means 28 in the closed position, as shown in FIG. 1, to a second position, such as that shown in FIG. 2, allowing the closure means 28 to be moved to the open position. In the illustrations of FIGS. 1 and 2, the latch means 34 is shown as a spring clip. The latch means may also take the form of a spring loaded hinge in which case the hinge 30 is spring loaded for biasing the closure means 28 into the closed position. If desired, of course, both a spring loaded hinge and a spring clip may be utilized to ensure positive closing of the closure means 28. A resilient pad means 36 may be coupled to inside surfaces of the closure means 28 to aid in providing the powder sealing relationship between the closure means 28 and the first portions 20 of the peripheral walls 18 of the drum means 14 when the pre-selected surface 32 is not inserted therein in order to prevent any inadvertent spilling of the fingerprint powder 26 through the aperture 22.

It will be appreciated that the drum means 14 is, in preferred embodiments of the present invention, a sealed container having only the opening provided by aperture 22 thereon. Thus, the fingerprint powder 26 may be added to the powder containing cavity 24 through the aperture 22 as desired and thus, only this single aperture need be sealed to prevent inadvertent loss of the fingerprint powder therefrom.

As noted above, the drum means 14 is movably mounted on the frame means 12 and, for example, may be rotatably mounted for rotation about the axis 16. To achieve this rotation, a handle means 38 extends through the frame means 12 and through pillow block 40 containing suitable bearing for support thereof, and is coupled to coupling block 42 coupled to the peripheral walls 18 of the drum means 14. Rotation of the crank means 38 provides rotation in the direction indicated by the arrow 44 of the drum means 14. In the embodiment 10, the drum means 14 rotates through a full 360°.

It has been found that when the fingerprint powder 26 is of a very fine mesh, it may tend to cake in regions adjacent the first portion 20 of the peripheral walls 18 of the drum 14 and thus, when the pre-selected surface 32 is removed, some powder may inadvertently escape. In order to prevent this undesirable loss of the fingerprint powder 26, it has been found desirable, in some embodiments of the present invention, to incorporate a vibration inducing means to vibrate the drum. One such vibration inducing means is illustrated in the drawing and comprises a plurality of protuberances 46 coupled to the frame means 12 and a striker bar 48 coupled to the drum means 14. The protuberances 46 are positioned on the frame means 12 so that the striker bar 14 strikes the protuberances thus, vibrating the drum means 14 as the drum means 14 approaches the position wherein the closure means 28 is vertically up, which is the position for insertion and removal of the preselected surface 32. It has been found that such vibration means shakes loose any caked powder and allows clean insertion and removal of the pre-selected surface 32.

As a further and additional safety means for preventing any inadvertent loss of powder from the drum means 14, some embodiments of the present invention may include an interlock means, generally designated 50. The interlock means 50 may comprise a segmented guard ring coupled to the frame means 12 and engaging the closure means 28 during pre-selected portions of each revolution of the drum means 14 about the axis 16. The pre-selected portion may, for example, be 270° of each revolution. During other portion of the revolution of the drum means, for example, approximately 90°, the segmented ring 50 is free of contact with the closure means 28. The other portions of each revolution comprising the above-mentioned approximately 90° may comprise 90° centered about the vertical plane passing through the axis 16. Thus, the closure means 28 may be freely opened and closed without interference from the segmented ring 50.

In operation, when it is desired to provide a visual image of a fingerprint, the person whose fingerprint is to be developed places his finger upon a pre-selected surface such as, for example, a check, illustrated as pre-selected surface 32 in the drawing. The drum 14 is then rotated so that the closure means 28 is in the vertically up position and the closure means is opened. The pre-selected surface is inserted over the aperture 22 with the portion containing the fingerprint immediately thereover.

The closure means is then closed and, if a latch means 34 is provided, the latch means may be engaged for detachably clamping the closure means in the closed position clamping the pre-selected surface 32 over the aperture 22. The handle 38 is then actuated at least once to rotate the drum means 14 so that the fingerprint powder 26 contacts the pre-selected surface 32 in regions over the aperture 22. The latch means may then be moved to allow opening of the closure means 28 when in the vertical up position, and removal of the pre-selected surface 32. The fingerprint powder, having contacted the pre-selected surface 32 provides the visual image thereon of the fingerprint.

In the embodiment 10 described above, the drum means 14 was manually moved by means of the handle 38. The embodiment 10 is provided for one complete rotation of the drum means 14 each time it was desired to provide an image of a fingerprint. It will be appreciated, of course, that instead of manual operation, the handle means 38 could be replaced by, for example, an electric motor to rotate the drum means each time it is desired to obtain the fingerprint image.

Figure 4:
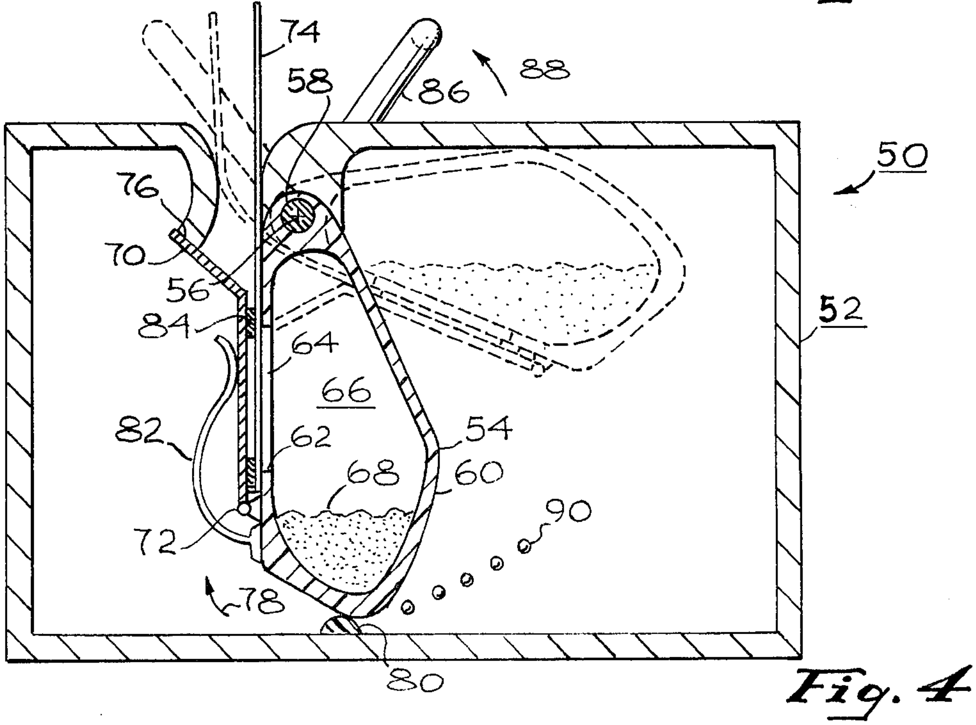
FIG. 4 is a sectional view of another embodiment of the invention.

The drum means need not be rotated through a full 360° arc of rotation, as shown in the embodiment 10 described above, in order to provide the desired fingerprint image. That is, an arc rotation less than 360° may be utilized to provide satisfactory operation of the structure according to the principles of the present invention. FIG. 4 illustrates an embodiment of the invention, generally designated 50, in which rotation of the drum through an arc of only approximately 90° provides the desired contact of the fingerprint powder with the surface upon which the fingerprint is present to achieve the desired fingerprint image. As shown on FIG. 4, embodiment 50 generally comprises a frame means 52 upon which there is movably mounted a drum means 54. Drum means 54 may be rotatably mounted on the frame means 52 for rotation about an axis 56 passing through axle 58. The drum means 54 is rigidly coupled to the axle 58 for rotation therewith.

The drum means 54 has peripheral walls 60 and a first portion 62 of the peripheral walls 60 define an aperture 64 providing communication with a powder containing cavity 66 defined by the peripheral walls 60.

A pre-determined amount of fingerprint powder 68 is contained within the powder containing cavity 66 of the drum means 54 and the fingerprint powder 68 may be similar to the fingerprint powder 26 described above. A closure means 70 is coupled to the peripheral walls 60 of the drum means 54 adjacent the aperture 64. The closure means 70 may, for example, be hingedly coupled thereto by means of hinge means 72 which, for example, may be spring loaded for urging the closure means 70 over the aperture 64. The closure means 70 is movable from the closed position shown in FIG. 4, to an open position to allow insertion and removable of a pre-selected surface 74 having a fingerprint thereon and which fingerprint is to be provided with the desired fingerprint image. For embodiment 50 shown in FIG. 4, the closure means 70 abuts against a shoulder means 76 of the frame means 52 when in the position shown in solid lines in FIG. 4. A slight rotation of the drum means 54 about the axis 56 in the direction indicated by the arrow 78 forces the closure means 70 open to allow insertion and/or removal of the pre-selected surface 32. A resilient stop means 80 is coupled to the frame means 52 and stops rotation of the drum means 54 in the position shown in sold lines in FIG. 4. However, because of the resilient nature of the stop means 80 slight movement in the direction of the arrow 78 is allowed to provide the opening of the closure means 70.

A latch means 82 which, for example, may be a spring clip similar to the latch means 34 shown in FIGS. 1 and 2 may be provided to insure closure of the closure means 70 during operation of the embodiment 50. Resilient pad means 84 which, for example, may be similar to the resilient pad 36 described above may be coupled to the inside of the closure means 70 to aid in providing the powder sealing relationship between the closure means 70, and the peripheral walls 60 of the drum means 54 when the pre-selected surface is not inserted therein.

A motion producing means such as a handle means 86 is coupled to the axle 58 to impart rotary motion to the drum means 54. After the pre-selected surface 74 has been inserted over the aperture 64 and held in place by the closure means 70 and latch means 82, the handle means 86 may be rotated in the direction indicated by the arrow 88 approximately 90° to the position shown in dotted lines in FIG. 4. In this position, because of the particular shape of the drum means 54 and the amount of fingerprint powder 68 contained therein, it is insured that, when the drum means 54 has been rotated in the direction of the arrow 88 to the position shown in dotted lines on FIG. 4, the fingerprint powder 68 contacts the pre-selected surfaces 74 to provide the desired fingerprint image thereon.

In the embodiment 50 shown on FIG. 4, gravity forces may be utilized to rotate the drum means 54 from the position shown in dotted lines in FIG. 4 in the direction of the arrow 78 back to the position shown in solid line in FIG. 4, and the rotation thereof is stopped by abutement with the resilient stop means 80. Alternatively, the drum means 54 may be spring loaded for automatic return.

Vibration inducing means may also be provided in the embodiment 50 of FIG. 4 similar to the vibration producing means described above in connection with embodiment 10. As such, plurality of proturberances 90 may be coupled to the frame means 52 and proturberances 90 contact the drum means 54 as it approaches and leaves the stop means 80.

Thus, the embodiment 50 of the invention shows a pre-selected arc of rotation of approximately 90° to achieve the desired fingerprint image on the pre-selected surface 74.

From the above, it can be seen that there has been provided an improved fingerprint developing arrangement that is comparatively economic in cost and may be safely operated by comparatively unskilled personnel without danger of the fingerprint powder spilling from the structure. Therefore, the following claims are intended to cover all variations and adaptations of the present invention falling within the true scope and spirit thereof.

I claim:

1. An improved fingerprint developing arrangement for providing a visually detectable fingerprint image on a pre-selected surface having a fingerprint thereon, comprising, in combination:

a frame means;

a drum means movably mounted on said frame means and having peripheral walls defining a powder containing cavity, and said peripheral walls having a first portion defining an aperture therethrough providing communication with said powder containing cavity;

fingerprint powder in said powder containing cavity;

closure means coupled to said peripheral walls of said drum means adjacent said aperture and movable thereon from an open position allowing access to said aperture to a closed position removably clamping the pre-selected surface having the fingerprint thereon over said aperture in powder sealing relationship to said first portion of said peripheral walls;

latch means coupled to said drum means for detachably clamping said closure means in said closed position to prevent said fingerprint powder from leaving said powder containing cavity for the condition of said closure means in said closed position thereof, said latch means comprising:

a spring loaded hinge means for coupling said closure means to said drum means, and said spring loaded hinge means resiliently biasing said closure means into said closed position thereof;

motion producing means for moving said drum means to provide contact between the pre-selected surface in said aperture and said fingerprint powder in said powder containing cavity, said motion producing means comprising:

a rotation producing means for rotating said drum means in a preselected arc of rotation about a pre-determined axis, and said fingerprint powder contacting the preselected surface in said aperture at least once during each movement in said preselected arc of rotation thereof;

said drum means rotatably mounted on said frame means;

interlock means operatively connected between said frame means and said drum means for preventing said closure means from moving from said closed position to said open position thereof for a predetermined portion of said preselected arc of rotation of said drum means;

vibration producing means for inducing a vibration of said drum means to jar said fingerprint powder loose from regions adjacent said first portion of said peripheral walls, said vibration inducing means comprising:

a purality of protuberances coupled to said frame means in a preselected spaced relationship thereon adjacent said drum means:

a striker bar means mounted on said drum means in protuberance engaging relationship to said plurality of protuberances for sticking said protuberances and vibrating said drum means during predesigned portions of said pre-selected arc of rotation of said drum means.

2. The arrangement defined in claim 1 wherein:

said latch means comprises a spring clip.

3. The arrangement defined in claim 1 wherein: said interlock means comprises:

a segmented ring mounted on said frame means adjacent said drum means for engaging said closure means during a pre-selected portion of said pre-determined arc of rotation of said drum means and free of contact therewith during other portions of said pre-determined arc of rotation of said drum means.

4. The arrangement defined in claim 1 wherein:

said drum means rotates through a 360° arc of rotation;

said pre-determined portion of said preselected arc of rotation comprises approximately 270°.

5. The arrangement defined in claim 1 wherein said preselected arc of rotation comprises approximately 90°.

6. The arrangement defined in claim 1 and further comprising:

resilient stop means coupled to said frame means in drum engaging relationship to said drum means for resiliently stopping rotation of said drum means in a predetermined position thereof.

* * * * *